(12) United States Patent
Kuhm et al.

(10) Patent No.: US 9,783,243 B2
(45) Date of Patent: Oct. 10, 2017

(54) SEALING PLUG, ASSEMBLY AND METHOD FOR SEALING AN OPENING

(71) Applicant: ITW FASTENER PRODUCTS GmbH, Iserlohn (DE)

(72) Inventors: Michel Kuhm, Ingwiller (FR); Stephane Dorschner, Weiterswiller (FR)

(73) Assignee: Illinois Tool Works Inc., Glenview, IL (US)

( * ) Notice: Subject to any disclaimer, the term of this patent is extended or adjusted under 35 U.S.C. 154(b) by 21 days.

(21) Appl. No.: 15/008,493

(22) Filed: Jan. 28, 2016

(65) Prior Publication Data

US 2016/0244104 A1 Aug. 25, 2016

(30) Foreign Application Priority Data

Feb. 24, 2015 (FR) ..................................... 15 51554

(51) Int. Cl.
*B62D 25/24* (2006.01)
*B05C 21/00* (2006.01)

(52) U.S. Cl.
CPC ............ *B62D 25/24* (2013.01); *B05C 21/005* (2013.01)

(58) Field of Classification Search
CPC ........ B62D 25/24; B62D 29/002; B62D 1/16; B62D 25/2054; B62D 47/025; B29C 44/188
USPC ........... 296/1.06, 97.22, 166, 204, 1.08, 208
See application file for complete search history.

(56) References Cited

U.S. PATENT DOCUMENTS

| | | | | |
|---|---|---|---|---|
| 4,801,040 A | * | 1/1989 | Kraus | B62D 25/24 220/787 |
| 6,319,436 B1 | * | 11/2001 | Jaeger | B29C 44/0461 264/255 |
| 6,588,071 B2 | * | 7/2003 | Gramss | B60R 13/04 24/297 |

(Continued)

FOREIGN PATENT DOCUMENTS

| | | |
|---|---|---|
| DE | 19546160 | 6/1997 |
| DE | 60204131 | 2/2006 |
| EP | 1375208 | 5/2005 |

*Primary Examiner* — Glenn Dayoan
*Assistant Examiner* — Sunsurraye Westbrook
(74) *Attorney, Agent, or Firm* — Joseph M. Butscher; The Small Patent Law Group, LLC

(57) ABSTRACT

A sealing plug for closing an opening in a component, in particular a body component of a motor vehicle, has a base body which is formed such that it can cover the opening and engage behind an edge of the opening. On the base body a sealing body is arranged, which includes a ring portion and several lamellae with free radial ends, which protrude from the ring portion and are flexible in circumferential direction. The sealing plug is pushed into the opening such that the rear-side latching lip engages behind the edge of the opening, wherein the lamellae of the sealing body are deformed in circumferential direction and center the sealing plug in the opening. After heating of the sealing plug a sealing material of the sealing body, which expands under the influence of heat, encloses the inner edge of the opening as well as radially adjoining regions of the front side and the rear side of the component around the entire circumference of the opening and completely fills the space formed between the supporting lip, the latching lip and the component.

15 Claims, 4 Drawing Sheets

(56) References Cited

U.S. PATENT DOCUMENTS

| | | | | |
|---|---|---|---|---|
| 8,070,008 B2* | 12/2011 | Janke | ............... | B62D 25/24 |
| | | | | 16/2.2 |
| 8,162,166 B2* | 4/2012 | Nakazato | ............... | B62D 25/24 |
| | | | | 220/359.4 |
| 8,919,606 B2* | 12/2014 | Sato | ............... | B62D 25/24 |
| | | | | 215/363 |
| 2004/0091335 A1 | 5/2004 | Nagasawa et al. | | |
| 2007/0062962 A1* | 3/2007 | Iwahara | ............... | B60R 13/06 |
| | | | | 220/796 |
| 2015/0135598 A1* | 5/2015 | Jatzke | ............... | B62D 25/24 |
| | | | | 49/463 |

* cited by examiner

Fig. 5
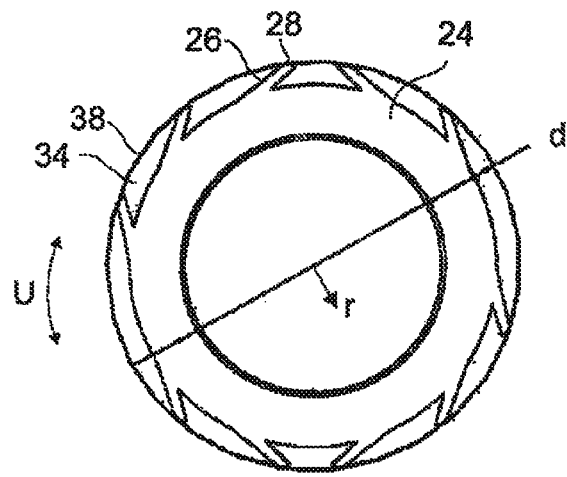
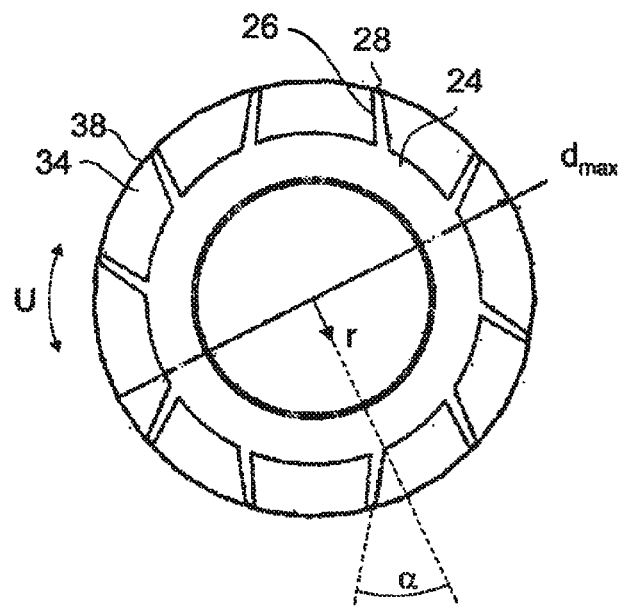
Fig. 6

SEALING PLUG, ASSEMBLY AND METHOD FOR SEALING AN OPENING

RELATED APPLICATIONS

This application corresponds to French Application No. 1551554, filed Feb. 24, 2015, the subject matter, of which is incorporated herein by reference in its entirety.

BACKGROUND OF THE INVENTION

The invention relates to a sealing plug for closing an opening in a component, in particular a body component of a motor vehicle. The invention also relates to an assembly with such sealing plug and to a method for sealing an opening.

When manufacturing vehicle bodies, it is required to seal openings in various body components, in order to prevent the ingress of dirt or water. These openings only are closed, for example, when during the painting operation the respective body component is transferred into a heating furnace for melting and curing the applied paint.

For this purpose sealing plugs are used, which are inserted into the openings of the body component and which are fixed for example by means of suitable latching elements which engage into the opening of the component. The sealing plug at the same time can effect sealing of the opening, wherein it is known for example to permanently glue at least a portion of the sealing plug to the edge of the opening. For example, a portion of the sealing plug is fabricated of a material melting or expanding under the influence of temperature, so that when the component is heated, e.g. during painting, the sealing plug is cohesively connected with the edge of the opening. Thus, the opening is seated watertight and at the same time the sealing plug is attached to the body part.

Such sealing plug is described for example in DE 602 04 131 T2, wherein there are provided two concentric rings of melting material, which are connected with each other by several ribs, the radially outer ring resting beside the edge of the opening and the radially inner ring resting against the inner edge of the opening.

In all known concepts it is disadvantageous that the sealing ping must be adapted to the diameter of the opening rather exactly and thus a multitude of sealing plugs must be prefabricated and held in stock for different opening diameters.

SUMMARY OF THE INVENTION

It is the object of the invention to create a sealing plug which can be used for openings with different diameters.

According to the invention, this is achieved with a sealing plug for closing an opening in a component, in particular a body component of a motor vehicle, which has a base body which is formed such that it can cover the opening and engage behind an edge of the opening, wherein on the base body a sealing body is arranged, which includes a ring portion and several lamellae with free radial ends, which protrude from the ring portion and are flexible in circumferential direction. Due to their movability in circumferential direction, the lamellae more or less can rest against the ring portion and thus provide for the sealing body to be inserted into openings with different diameter, wherein the lamellae always rest against the inner edge of the opening.

The diameter range here is dependent on the length of the lamellae. A minimum diameter is defined in that with inserted sealing plug the lamellae virtually completely rest against the ring portion, whereas the maximum diameter is determined by the fact that the lamellae protrude radially to the outside as far as possible.

The lamellae preferably are formed elastic and thus exert a restoring force in circumferential and radial direction, which ensures that the sealing plug is stock in the opening and in addition effects cantering of the sealing plug in the opening. The material of the sealing plug should be elastic for this purpose.

For example, about ten lamellae with a length of about 3-5 mm can be provided, which allows a variation of the opening diameter of about 5 mm, such as for the use of openings with a diameter between 30 and 35 mm.

The lamellae preferably extend in the plane of the ring portion, so that with the sealing plug inserted into the opening, the ring portion also lies at the height of the inner edge of the opening. The lamellae preferably extend along the entire axial length of the ring portion.

In a preferred embodiment, the base body has a circumferential supporting lip and a circumferential latching lip for contact with a front side and a rear side of the component, wherein the sealing body is accommodated between the supporting lip and the latching lip. The lamellae also preferably are completely accommodated in the space formed by the lips and are protected by the same.

The lips for example extend obliquely and each form a truncated cone.

In the mounted state, the latching lip should engage behind the rear edge of the opening and thus provide for latching of the entire sealing plug upon insertion in the desired position.

The base body can include an all-round circumferential wall and the sealing body, in particular its ring portion, can rest against the circumferential wall radially on the outside. This construction provides for a stable radial support of the sealing body and generates a sufficient counterpressure, in order to fix the sealing plug in the opening upon insertion.

When the lamellae at their free radial ends are beveled at the axial end on the side of the latching lip, this bevel facilitates folding over in circumferential direction when the sealing plug is pushed into the opening. When the sealing plug is pushed in, the bevel at the opening-side axial end of the lamellae rests on the inside of the latching lip. When the latching lip comes to rest on the inner edge of the opening, the latching lip exerts a force on the lamellae which acts obliquely to the inside, and initiates folding over of the lamellae in circumferential direction. When the sealing plug is pushed further into the opening, the lamellae then are folded over in circumferential direction due to the elastic deformation of the latching lip. When the latching lip engages behind the edge of the opening in the mounted position, the lamellae again are stretched due to their inherent elasticity to such an extent that they rest against the inner edge of the opening. The sealing plug thereby is centered in the opening. In this mounted state, the lamellae directly rest against the inner edge of the opening, while the latching lip engages behind the edge of the opening. No more contact is necessary between the lamellae and the latching lip.

In one possible embodiment the unloaded lamellae are aligned at an angle of about 10-40°, in particular at an angle of about 30°, to the radial direction. It was found out that in this way folding over easily is effected in circumferential direction, as the unloaded lamellae already are positioned at an angle to the radial direction, which on insertion into the opening specifies a force component in circumferential direction.

The sealing body, including the lamellae, preferably is made of a material expanding under the influence of heat. The quantity of expanding sealing material advantageously is dimensioned such that under the influence of heat of for example about 120-180° C. the space between the supporting lip and the latching lip and around the edge of the opening is stilled completely. There is preferably provided a sufficient quantity of sealing material, in order to completely fill the space enclosed by the supporting lip and the latching lip also at maximally provided opening diameter. During its expansion, the sealing material fills the diameter of the opening from the circumferential wall of the sealing plug to the inner edge of the opening and in addition also covers portions of the component radially outside the opening both on the front and on the rear side of the component. In this way, a circumferentially closed watertight sealing is achieved. Expanding of the sealing body for example is effected when the same is heated during painting.

The base body on the other hand should be formed of an elastic, but dimensionally stable material and preferably is formed integrally. There can be used for example a semi-rigid plastic material with a Shore D hardness of 30-50, for example TEE or TPE or another suitable thermoplastic elastomer.

The sealing body can be fabricated together with the base body by a two-component injection molding method, in order to simplify the manufacture.

The invention also relates to an assembly with a sealing plug for closing an opening in a component, in particular a body component of a motor vehicle, and a component with an opening, wherein the sealing body has a base body which is formed such that it can cover the opening and engage behind an inner edge of the opening, wherein on the base body a sealing body is arranged, which includes a material expanding under the influence of heat, wherein after heating of the sealing plug the material expanding under the influence of heat encloses the inner edge of the opening as well as radially adjoining regions of a front side and a rear side of the component around the entire circumference of the opening.

As described above, the sealing body can include lamellae protruding to the outside, but might also be shaped differently. After insertion of the sealing plug into the opening and subsequent heating, the expanding sealing material fills the space around the inner edge of the opening completely and, as far as possible, without cavities and thus seals the opening.

The invention also relates to a method for sealing an opening in a component. A sealing plug as described above, which includes a front-side supporting lip and a rear-side latching lip, is pushed into the opening of the component, so that the rear-side latching lip engages behind the edge of the opening. The lamellae of the sealing body thereby am deformed in circumferential direction and center the sealing plug in the opening. The component is heated, wherein a material of the sealing body expanding under the influence of heat expands and encloses the inner edge of the opening as well as radially adjoining regions of the front side and the rear side of the component, and completely fills the space formed between the supporting lip, the latching lip and the component. During heating, the supporting lip and the latching lip hold the sealing plug in position. After heating, the sealing material preferably completely fills the space between the lips, so that no cavities remain within the space enclosed by the supporting lip and the latching lip, which lowers the corrosion risk.

After expansion of the material of the sealing body, the pull-out force can be greater than 400 N.

BRIEF DESCRIPTION OF THE DRAWINGS

The invention will be described in detail below by means of an exemplary embodiment with reference to the attached drawings. In the drawings:

FIG. 5 shows a schematic sectional view of the sealing plug of FIG. 1 inserted into a component with a first opening diameter;

FIG. 6 shows a schematic sectional view of the sealing plug of FIG. 1 inserted into a component with a maximum opening diameter.

DETAILED DESCRIPTION OF THE INVENTION

Figure 1:
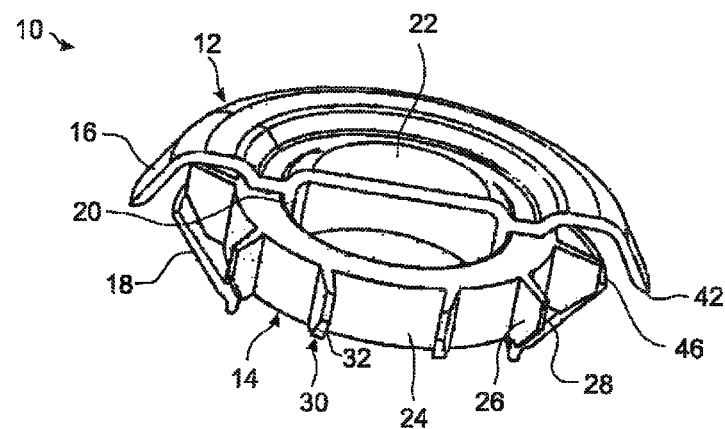
FIG. 1 shows a schematic, perspective, partly sectional representation of a sealing plug according to the invention.

FIG. 1 shows a sealing plug 10 which includes a base body 12 and a sealing body 14 arranged on the base body. In this example, the sealing plug 10 consists of these two components.

The base body 12 includes a circumferentially extending supporting lip 16 as well as a circumferentially extending latching lip 18, which both extend obliquely towards each other along the radial direction r. The supporting lip 16 extends further to the outside in radial direction r than the latching lip 18.

Supporting lip 16 and latching lip 18 are integrally connected with each other via a circumferential wall 20.

The supporting lip 16 integrally merges into a lid portion 22, so that the supporting lip 16 and the lid portion 22 together form a closed surface.

The sealing body 14 consists of a circumferentially closed ring portion 24 and several lamellae 26 with free radial ends 28, which protrude to the outside from the ring portion 24. The lamella 26 here extend along the entire axial height of the ring portion 24. The lamellae 26 are formed integrally with the ring portion 24. In this example, 10 lamellae are distributed around the circumference of the ring portion 24, but the number of the lamellae 26 can be varied within the discretion of the skilled person.

The lamellae 26 do not extend exactly in radial direction r away from the ring portion 24, but are inclined with respect to the radial direction r at an angle of about 30° (see e.g. FIG. 1).

The ring portion 24 is arranged resting against the circumferential wall 20 of the base body radially on the outside.

In the embodiment shown here, the entire sealing plug 10 is integrally manufactured by a two-component injection molding method.

As material for the base body a semi-rigid, dimensionally stable, but elastic material is used in this example, for example a TEE or a TPE (available under the trade name Arnitel®) or another suitable thermoplastic elastomer, in particular with a Shore D hardness of 30-50.

However, the sealing body 14 here consists of a material expanding under the influence of heat, wherein every known, suitable material can be used, which at a temperature between about 120-180° C. increases its volume.

At their axial end 30 pointing to the supporting lip 18, all lamellae 26 have a bevel 32. The angle of the bevel 32 is chosen approximately as large as the angle at which the latching lip 18 is aligned with respect to the axial direction A in the relaxed state (see for example FIGS. 1 and 2).

Figure 2:
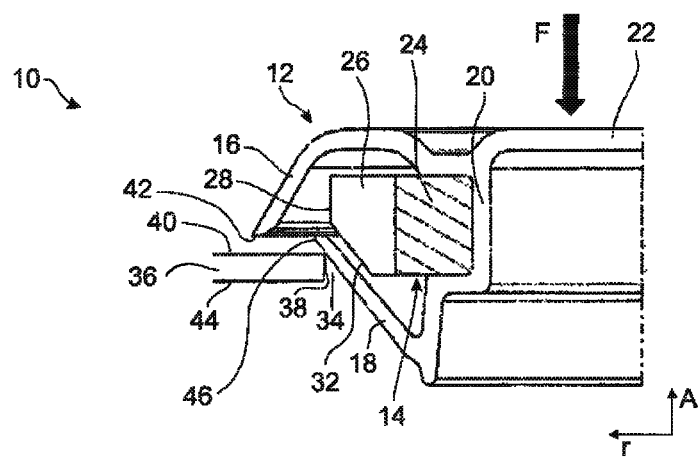
FIG. 2 shows a schematic sectional view of the sealing plug of FIG. 1 during a first step on insertion into an opening in a component.
Figure 3:
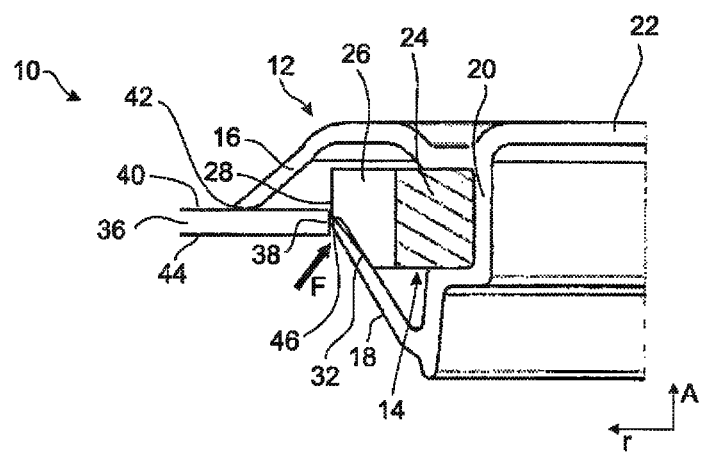
FIG. 3 shows a schematic sectional view of the sealing plug of FIG. 1 during a second step on insertion into the opening.
Figure 4:
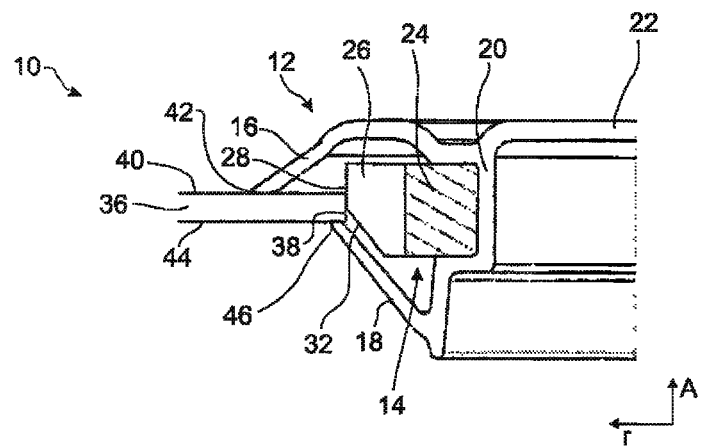
FIG. 4 shows the sealing plug of FIG. 1 in a schematic sectional view in its final position inserted into the opening of the component, before heating.

FIGS. 2 to 4 show the insertion of the sealing plug 10 into an opening 34 of a component 36 at normal room temperature before heating of the sealing plug 10.

The sealing plug 10 is pushed into the opening 34 with the latching lip 18 first (see FIG. 2), wherein the latching lip 18 initially comes to rest against the inner edge 38 of the opening 34. The latching lip 18 thereby is deformed radially to the inside, while it is pushed through the opening 34. As a result, the latching lip 18 comes to rest against the bevel 32 of the lamellae 26, as can be seen in FIG. 3.

Due to the already existing angle □ with respect to the radial direction r, the respective lamella 26 is folded over in circumferential direction U when a force acts in axial direction A, whereby the effective diameter of the sealing body 14 is reduced and adapted to the diameter d of the opening 34.

Figure 7:
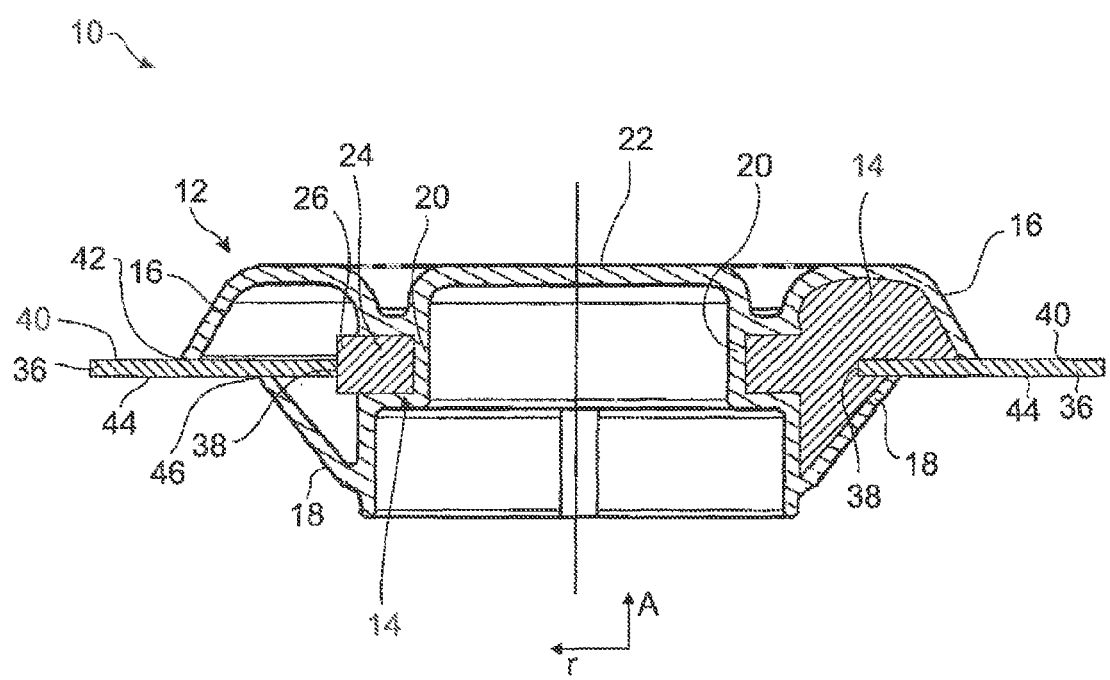
FIG. 7 shows a schematic sectional view of the sealing plug, inserted into an opening, wherein the left side of the Figure shows the sealing plug before heating and the right side of the Figure shows the sealing plug after heating.

After the latching lip 18 has passed the edge of the opening 34, it engages behind the same on a rear side 40 of the component 36 (see FIGS. 4 and 7). The latching lip 18 again separates from the lamellae 26, and due to their inherent elasticity the same relax, until the free radial ends 28 of the lamellae 26 come to rest against the inner edge 38 of the opening 34. In this way, the sealing plug 10 is centered in the opening 34.

The sealing plug 10 is designed for the use in openings 34 with different diameters d between a minimum diameter and a maximum diameter $d_{max}$. Depending on the magnitude of the diameter d the lamellae 26 more or less are deformed in circumferential direction U. FIG. 5 shows the situation in an opening 34 close to the minimum diameter, where the lamellae 26 are folded over at an almost maximum angle to the radial direction r, whereas FIG. 6 shows the situation in an opening 34 with a maximum diameter $d_{max}$, where the lamellae 26 almost are in their unloaded state. In principle, in the case of an opening with minimum diameter the lamellae 26 can rest flat against the outer circumference of the ring portion 24, but a better centering effect is achieved when the lamellae 26 still have some clearance.

The diameter d of the opening 34 of course always is chosen larger than the outside diameter of the ring portion 24 and smaller than a diameter $d_{max}$ described by the free radial ends 28 of the lamellae 26 (see also FIGS. 5 and 6).

For example, opening diameters d of about 30-35 mm thus can be covered, wherein the length of the lamellae 26, as measured along their extension proceeding from the circumference of the ring portion 24, can be about 3-5 mm.

In the premounted position, in which the latching lip 18 engages behind the mar side 40 of the component 36, the radially outer edge 42 of the supporting lip 16 rests on a front side 44 of the component 36, whereas a radially outer edge 46 of the latching lip 30 rests against the rear side 40 of the component 36.

After the sealing plug 10 has been latched in the opening 34 in the position shown in FIG. 4 and on the left side of FIG. 7, and the lamellae 26 have come to rest against the inner edge 38 of the opening 34, the component 36 is heated together with the inserted sealing plug 10. The material of the sealing body 14 expands in the process. The material quantity of the sealing body 14 is dimensioned such that the space enclosed by the circumferential wall 20, the supporting lip 16 and the latching lip 18 is filled completely by the now expanding sealing material.

In this way, the entire edge of the opening 34, both the inner edge of the opening and the radially adjoining regions of the rear side 40 and the front side 44, are covered by sealing material completely and around the circumference. Within the space thus enclosed by the base body 12 of the sealing plug 10 preferably no cavities remain, in order to avoid a condensation of steam and a contact of water with the component 36 in the region of the sealing plug 10.

In a non-illustrated embodiment, the sealing body of the sealing plug has no flexible, outwardly protruding lamellae, but in particular has a smooth outer contour. The outer contour might also be formed ribbed or knobbed, for example, but might also extend conically. In order to here as well provide for an adaptation to different opening diameters. Here as well, however, the entire edge of the opening 34, both the inner edge of the opening and the radially adjoining regions of the rear side 40 and the front side 44, is covered by sealing material completely and around the circumference.

By embedding the edge of the opening 34 into the sealing material, very high pull-out forces of e.g. >400 N and a high water tightness, for example a tightness which corresponds to a tightness in a water depth of 1 m for one hour, can be achieved.

The invention claimed is:

1. A sealing plug for closing an opening in a component, in particular a body component of a motor vehicle, said sealing plug having a base body which is formed such that it can cover said opening and engage behind an edge of said opening, a sealing body being arranged on said base body, said sealing body including a ring portion and several lamellae with free radial ends, said lamellae protruding from said ring portion and being flexible in a circumferential direction, said lamellae being beveled at an axial end on a side of said latching lip.

2. The sealing plug of claim 1 wherein said base body has a circumferential supporting lip and a circumferential latching lip for contact with a front side and a rear side of said component, said sealing body being accommodated between said supporting lip and said latching lip.

3. The sealing plug of claim 1 wherein said base body includes an all-round circumferential wall and said sealing body rests against said circumferential wall radially on an outer side.

4. The sealing plug of claim 1 wherein said lamellae, in an unloaded condition, are aligned at an angle of 0-40°, in particular about 30°, with respect to a radial direction.

5. The sealing plug of claim 1 wherein said sealing body consists of a material expanding under the influence of heat.

6. The sealing plug of claim 1 wherein said base body is integrally formed of an elastic, but dimensionally stable material.

7. The sealing plug of claim 1 wherein said sealing body together with said base body is fabricated by a two-component injection molding method.

8. An assembly comprising the sealing plug of claim 1 and the component, wherein said sealing plug is inserted in said opening, wherein said sealing body covers said opening and engages behind an inner edge of said opening, wherein said sealing body is formed from a material that expands under the influence of heat and wherein after heating of said sealing plug, said sealing body encloses said inner edge of said opening as well as radially adjoins regions of a front side and a rear side of said component around an entire circumference of said opening.

9. A sealing plug configured to close an opening in a component, the sealing plug comprising:
   a base body that is configured to cover the opening; and
   a sealing body coupled to the body, the sealing body including a ring portion and lamellae with free radial ends outwardly extending from the ring, wherein the lamellae outwardly protrude from the ring portion and are flexible in a circumferential direction, wherein the sealing body is formed of a material that is configured to expand when heated.

10. The sealing plug of claim 9, wherein the base body comprises a circumferential supporting lip and a circumferential latching lip that are configured to contact a front side and a rear side of the component, wherein the sealing body is disposed between the supporting lip and the latching lip.

11. The sealing plug of claim 9, wherein the base body comprises a circumferential wall, and wherein the ring portion of the sealing body surrounds the circumferential wall.

12. The sealing plug of claim 9, wherein the lamellae are beveled at an axial end on a side of the latching lip.

13. The sealing plug of claim 9, wherein the lamellae, in an unloaded condition, are aligned at an angle between 10°-40° with respect to a radial direction.

14. The sealing plug of claim 9, wherein the base body is integrally formed of an elastic and dimensionally stable material.

15. The sealing plug of claim 9, wherein the sealing body together with the base body is fabricated by a two-component injection molding method.

* * * * *